US009841074B2

(12) United States Patent
Roos

(10) Patent No.: US 9,841,074 B2
(45) Date of Patent: Dec. 12, 2017

(54) ACTUATOR FOR A FUNCTIONAL UNIT OF A MOTOR VEHICLE

(71) Applicant: BROSE FAHRZEUGTEILE GMBH & CO. KOMMANDITGESELLSCHAFT, WUERZBURG, Wuerzburg (DE)

(72) Inventor: Stephan Roos, Wertheim-Hoehefeld (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 260 days.

(21) Appl. No.: 14/658,665

(22) Filed: Mar. 16, 2015

(65) Prior Publication Data

US 2015/0184713 A1 Jul. 2, 2015

Related U.S. Application Data

(63) Continuation of application No. PCT/EP2013/002757, filed on Sep. 13, 2013.

(30) Foreign Application Priority Data

Sep. 14, 2012 (DE) .......................... 10 2012 018 144

(51) Int. Cl.
*F16D 66/00* (2006.01)
*B60T 7/08* (2006.01)
(Continued)

(52) U.S. Cl.
CPC .............. *F16D 66/00* (2013.01); *B60T 7/085* (2013.01); *B60T 7/107* (2013.01); *B60T 13/746* (2013.01); *F16D 2066/005* (2013.01)

(58) Field of Classification Search
CPC ............... F16D 66/00; F16D 2066/003; F16D 2066/005; B60T 7/042
See application file for complete search history.

(56) References Cited

U.S. PATENT DOCUMENTS 4,532,462 A * 7/1985 Washbourn ........... B60T 8/1893
188/162
4,546,298 A 10/1985 Wickham et al.
(Continued)

FOREIGN PATENT DOCUMENTS

DE 3709952 C1 8/1988
DE 102004006801 A1 8/2004
(Continued)

*Primary Examiner* — Vishal Sahni
(74) *Attorney, Agent, or Firm* — Laurence A. Greenberg; Werner H. Stemer; Ralph E. Locher

(57) ABSTRACT

An actuator for a motor vehicle functional unit includes a force transmission unit transmitting an actuating force to an actuating member and being displaced by a measuring travel in a force transmission direction. A force measurement device detects an actual value of the actuating force and includes a spring acting in the force transmission direction, having resilient action counter to which the force transmission unit is displaced and being tensioned by the actuating force over a resilient excursion, a micro switch having smaller switching travel than the measuring travel and being actuated upon displacement of the force transmission unit if the actuating force reaches the actual value, and a stop element for actuating the switch. The switch or element are coupled to or fixed relative to the force transmission unit and the switch and/or element are resiliently supported to compensate for a difference between the switching and measuring travels.

8 Claims, 5 Drawing Sheets

(51) Int. Cl.
*B60T 7/10* (2006.01)
*B60T 13/74* (2006.01)

(56) References Cited

U.S. PATENT DOCUMENTS

| | | |
|---|---|---|
| 4,805,740 A | 2/1989 | Wilke et al. |
| 7,448,475 B2 | 11/2008 | Mourad et al. |
| 7,490,699 B2 | 2/2009 | Gil et al. |
| 8,235,181 B2 | 8/2012 | Sano et al. |
| 8,662,263 B2 | 3/2014 | Deutloff et al. |
| 2003/0066714 A1 | 4/2003 | Flynn et al. |
| 2010/0219029 A1* | 9/2010 | Deutloff .................. B60T 7/085 188/2 D |
| 2014/0231194 A1 | 8/2014 | Deutloff et al. |

FOREIGN PATENT DOCUMENTS

| | | |
|---|---|---|
| DE | 102005012009 A1 | 11/2005 |
| DE | 10361127 B4 | 11/2006 |
| DE | 10356096 B4 | 5/2007 |
| DE | 102006054096 A1 | 5/2008 |
| EP | 0125874 A2 | 11/1984 |
| EP | 1593569 A1 | 11/2005 |
| EP | 1767419 A1 | 3/2007 |
| KR | 20060128935 A | 12/2006 |
| WO | 9856633 A1 | 12/1998 |
| WO | 02057122 A1 | 7/2002 |
| WO | 2005061293 A1 | 7/2005 |
| WO | 2007087914 A1 | 8/2007 |
| WO | 2008058830 A1 | 5/2008 |

* cited by examiner

ACTUATOR FOR A FUNCTIONAL UNIT OF A MOTOR VEHICLE

CROSS-REFERENCE TO RELATED APPLICATION

This is a continuation, under 35 U.S.C. §120, of copending International Application No. PCT/EP2013/002757, filed Sep. 13, 2013, which designated the United States; this application also claims the priority, under 35 U.S.C. §119, of German Patent Application DE 10 2012 018 144.2, filed Sep. 14, 2012; the prior applications are herewith incorporated by reference in their entirety.

BACKGROUND OF THE INVENTION

Field of the Invention

The invention relates to an actuator for a functional unit of a motor vehicle. In this instance, a functional unit of a motor vehicle may be understood to be any device of the motor vehicle which moves or adjusts a portion of a vehicle. The invention particularly relates to an actuator of an electronic parking brake.

In modern motor vehicles, parking brakes are increasingly used which are deployed and released by using an electromotive drive. That has the advantage that the brake lever in the interior space of the vehicle can be replaced with an electrical operating element, for example a button. The structural space obtained in that manner may be used, for example, to increase the seating comfort or the technical design configuration of the interior space, in particular as a result of operating elements being positioned in a manner orientated toward comfort.

In particular, in an electromotively operated parking brake, it is necessary to monitor the braking force, for example the tensile force of a brake cable, in order, on one hand, to achieve an adequate braking action and, on the other hand, to prevent overloading of the mechanical components of the actuator, that is to say, of the parking brake unit producing the braking force.

German Patent DE 103 56 096 B4 discloses a force measuring operation for a force producing device, which operation is carried out indirectly through the current measurement of an electric motor. Such indirect force measurement requires an additional evaluation unit in order to convert the measurement variable, that is to say, the motor current, into a force value. That type of force measurement generally further achieves only a low degree of accuracy.

German Patent DE 103 61 127 B4, corresponding to U.S. Pat. No. 8,662,263, further discloses an actuator in which the force applied is carried out by using an excursion measurement of a resilient element which is resiliently deformed as a result of the force transmission. The excursion measurement is carried out by detecting the movement of a magnet by using a Hall sensor. However, the use of a Hall sensor is cost-intensive and also requires an evaluation unit in which the signal of the Hall sensor is first converted into an excursion and subsequently into a force.

SUMMARY OF THE INVENTION

It is accordingly an object of the invention to provide an actuator for a functional unit of a motor vehicle, which overcomes the hereinafore-mentioned disadvantages of the heretofore-known actuators of this general type and which is simple and cost-effective.

With the foregoing and other objects in view there is provided, in accordance with the invention, an actuator for a functional unit of a motor vehicle, comprising a force transmission unit for transmitting an actuating force to an actuating member. The force transmission unit is supported so as to be displaceable by a measuring travel in the force transmission direction. The actuator further includes a force measurement device which is configured and provided to detect at least a first actual value of the actuating force. To that end, the force measurement device has at least a first spring which is orientated in the force transmission direction and counter to the resilient action of which the force transmission unit can be displaced. The spring can be tensioned under the action of the actuating force by a first resilient excursion, preferably if the actuating force reaches or exceeds the first actual value. The force measurement device further has a first micro switch having a switching travel which is smaller than the measuring travel of the force transmission unit. The first micro switch is actuated in the event of a displacement of the force transmission unit if the actuating force reaches the first actual value. In order to actuate the first micro switch, the force measurement device has a first stop element. The first stop element is connected to the force transmission unit and the first micro switch is fixed in position in relation to the force transmission unit. Alternatively, however, in the context of the invention it is also possible for the first micro switch to be connected to the force transmission unit and, instead, the first stop element to be fixed in position. The first stop element and/or the first micro switch are further supported in such a resilient manner that the difference between the switching travel of the micro switch and the measuring travel of the force transmission unit can be compensated for. That is to say that, when the force transmission unit is displaced by the measuring travel, the first stop element and/or the first micro switch can be compressed by the resilient support by the difference between the switching travel and the measuring travel and can consequently take up that difference.

As a result of the compensation for the difference between the switching travel and the measuring travel, it is advantageously possible to use a micro switch having a small switching travel in the case of a measuring travel which is large—in comparison with the switching travel. This is particularly advantageous when the micro switch is not actuated at the end of the measuring travel during the displacement of the force transmission unit, but instead, for example, at the beginning or in the middle of the measuring travel. Furthermore, micro switches are particularly inexpensive in comparison with displacement sensors such as, for example, inductive displacement sensors or Hall sensors, so that the actuator can advantageously be produced in a particularly cost-effective manner. The compensation for the difference between the switching travel of a touch contact switch (in particular a micro switch) and a (longer) measuring travel, by which the touch contact switch and a stop element which corresponds thereto—that is to say, which is provided to switch the touch contact switch—are displaced according to provisions, by a resilient bearing of the stop element and/or the touch contact switch, is considered to be an independent invention which can also be advantageously used independently of the remaining features of the above-described actuator, in particular in the case of different types of functional units of a motor vehicle. The stop element and the touch contact switch are preferably retained in this instance with pretensioning which exceeds the actuating force of the touch contact switch. In this manner, the resilient bearing of the stop element or touch contact switch gives way only when the touch contact switch is completely switched-through so that a precise switching point of the switching subassembly formed from the touch contact switch and the stop element is ensured.

The micro switch detects only one position at which the actuating force reaches or exceeds the first actual value. The first spring serves to define or establish the actuating force necessary for the displacement by the first resilient excursion. The first actual value of the actuating force is consequently directly correlated—through the resilient rigidity of the first spring—with the first resilient excursion. As a result of this structure of the force measurement device, a numerically complex conversion of a displacement signal, for example, a displacement sensor, correlated with the actuating force, or an evaluation of a directly measuring force sensor, can be dispensed with. The signal of the micro switch is instead preferably used directly in the actuator according to the invention in order to switch off a drive unit which produces the actuating force, preferably an electric motor which drives the actuator, when the first actual value is reached. Consequently, only a simple switching element is required to evaluate the switching signal, in place of a complex numerical logic unit. A particularly simple construction and, in particular, a simple control of the actuator are thereby possible. The signal of the micro switch can advantageously be transmitted directly, that is to say, without any signal transformation or conversion into a force value, to a control unit which is preferably integrated in a superordinate control unit or in the on-board system of the motor vehicle so that the actuator can be operated, in particular, without any integrated control unit (for example, a microprocessor).

In an embodiment of the actuator for driving an electronic parking brake, a spindle nut which drives a spindle provided as the actuating member is preferably used as the force transmission unit. For example, a brake cable, which transmits the actuating force to the brake pads of the parking brake, can be connected to the spindle in the context of the invention. In this instance, in the event that the actuator does not have an integrated control unit, a classification of the actuator in accordance with ASIL (Automotive Safety Integrity Level) may be dispensed with so that the production of the actuator is simple and cost-effective.

In accordance with another preferred feature of the invention, the first stop element is a first sensor pin which is resiliently supported—for example, in a sleeve by using a helical spring. The first sensor pin is particularly pretensioned with a sensor pin pretensioning force which is higher with respect to the actuating force of the first micro switch. It is thereby possible for the first sensor pin to actuate the first micro switch at a defined and preferably repeatable switching point. In particular, the pretensioned sensor pin first actuates the micro switch before the sensor pin is compressed counter to the sensor pin pretensioning force if the force transmission unit is further displaced. The sensor pin is advantageously supported in such a displaceable manner that it can be displaced over the entire measuring travel relative to the support thereof.

In accordance with a further advantageous and preferred feature of the invention, in order to further improve the actuator, in particular the operation thereof, for example, in order to set out a second actual value of the actuating force in order to switch off the actuator, the force measurement device includes a second spring which is disposed in series with respect to the first spring. The second spring is pretensioned by a pretensioning force which exceeds the first actual value of the actuating force. The second spring is thereby tensioned by a second resilient excursion if the actuating force exceeds the pretensioning force. The force measurement device is advantageously configured and provided to detect the first actual value and the second actual value of the actuating force. In principle, it is conceivable in the context of the invention for the first and the second resilient excursion, at which the first actual value and the second actual value are detected, to form only a partial-portion of the entire resilient deviation of the spring. In other words, the first or second actual value may already be detected when the force transmission unit, under the action of the actuating force, tensions the spring only by a (small) portion of the possible resilient deviation. In an alternative and simple embodiment, the first resilient excursion and the second resilient excursion may also correspond to the respective resilient deviation. To this end, for example, the first spring and the second spring are limited in terms of the resilient deviation thereof by using stops to the respective first and second resilient excursion, so that the measuring travel of the force transmission unit corresponds to the sum of the first and second resilient excursions. In the event that the actuator is used for a parking brake, the second actual value is advantageously provided to set out a switch-off criterion for the actuator when a desired braking force is reached in order to prevent an overload. The first actual value is provided to set out a switch-off criterion for the actuator when the parking brake is released so that a sufficiently small actuating force which ensures that the brake pads are released is achieved. Consequently, the actuator is controlled through the detection of two end positions (with which one of the actual values is respectively associated) and can thereby be readily operated.

In accordance with an added feature of the invention, the micro switch is constructed as a selective switch in order to detect the first actual value and the second actual value. To this end, the selective switch has a switching hysteresis between a switched-on state and a switched-off state. In other words, the switching positions associated with the switched-on state and the switched-off state of the selective switch are at different positions along the switching travel of the selective switch. When the force transmission unit is displaced by the second resilient excursion—in particular with the second spring being tensioned—the selective switch is switched into the switched-on state in order to detect the second actual value of the actuating force. When the actuating member or the force transmission unit and the first spring is relieved by the first resilient excursion, the selective switch is switched into the switched-off state in order to detect the first actual value. In other words, the selective switch is switched into the switched-on state when the first spring and the second spring are respectively tensioned by the resilient excursion. In the event of a relieving action, the selective switch is switched back into the switched-off state when the first spring is relieved, that is to say after relaxation of the second spring (with respect to the pretensioning force).

The first spring is preferably a spring having resilient rigidity which is substantially smaller in comparison with the second spring. The first spring is already tensioned by the first resilient excursion at a small actuating force of, for example, from 30 to 150 Newtons, while the second spring is tensioned by the second resilient excursion only at a comparatively high actuating force of, for example, from 1300 to 1800 Newtons. It is thereby possible for an actuating force which is sufficient for the braking action of the parking brake to be applied by the actuator when the second spring is tensioned by the second resilient excursion. However, the comparatively small actuating force for tensioning the first spring ensures reliable release of the parking brake. The first and second springs are preferably constructed as compression springs, in particular as helical springs.

In accordance with an additional preferred and advantageous alternative feature of the invention, the first micro switch is configured and provided to detect the first actual value, wherein the first micro switch is actuated by the first resilient excursion when the force transmission unit is displaced. In addition to the first micro switch, the force measurement device includes in this embodiment a second micro switch which is configured and provided to detect the second actual value. Consequently, the second micro switch is actuated by the second resilient excursion when the force transmission unit is displaced. The use of two, preferably structurally identical, micro switches in this instance allows a simple construction of the actuator. In particular, production and installation tolerances can be compensated for in a particularly simple manner by two micro switches. Furthermore, a particularly large difference between the measuring travel and the switching travel can also be taken into account by two micro switches.

In accordance with again another feature of the invention, in order to actuate the second micro switch, the force measurement device advantageously has a second stop element. The second stop element is connected to the force transmission unit while the second micro switch is disposed in a fixed manner relative thereto. Alternatively, it is also conceivable in the context of the invention for the second micro switch to be connected to the force transmission unit while the second stop element is mounted in a fixed manner. In principle, it is conceivable in the context of the invention for the second stop element and the second micro switch each to be connected rigidly, that is to say, in a non-movable manner, to the force transmission unit or to be mounted at a position which is respectively fixed relative thereto. Advantageously, however, the second micro switch and/or the second stop element are supported in a resilient manner similarly to the first micro switch and the first stop element so that the difference between the measuring travel and the switching travel and advantageously also tolerances as a result of production and assembly can be compensated for.

In accordance with again a further preferred feature of the invention, the second stop element is in the form of a second sensor pin. The second sensor pin is supported in a resilient manner and is, in particular, constructed so as to be structurally identical to the above-described first sensor pin.

In accordance with again an added simple feature of the invention, the first micro switch and the second micro switch are disposed in such a manner that the switching travel is orientated parallel with the force transmission direction. In a preferable manner, the first stop element and the second stop element are disposed offset relative to each other in the force transmission direction. In other words, for example, the first stop element projects in the force transmission direction beyond the second stop element. Alternatively, the first micro switch and the second micro switch may also be disposed offset relative to each other. The offset of the two stop elements (and/or optionally the two micro switches) is adjusted in such a manner that the first micro switch is actuated when the first actual value is reached and the second micro switch is actuated when the first actual value of the actuating force is reached.

In accordance with again an additional optional feature of the invention, which is considered to be an independent invention, the actuator includes a housing, by which the actuator is surrounded in a practically complete manner. On this housing, the first actual value and optionally the second actual value of the actuating force are indicated. The actual value or each actual value is advantageously established during the assembly of the actuator and subsequently indicated on the housing. The term "indicated" in this instance is intended to be understood to be any type of identification, for example printing, engraving, laser-inscription or lamination with a printed adhesive label. The integration of the actuator in the on-board system of the motor vehicle or in a control unit which is superordinate to the actuator is thereby readily possible, in particular since the actuator is not provided in a preferred embodiment with an individual control unit.

In accordance with a concomitant advantageous feature of the invention, the actual value or each actual value of the actuating force is marked on the housing in the form of a machine-readable encoding, in particular a bar code.

Other features which are considered as characteristic for the invention are set forth in the appended claims.

Although the invention is illustrated and described herein as embodied in an actuator for a functional unit of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
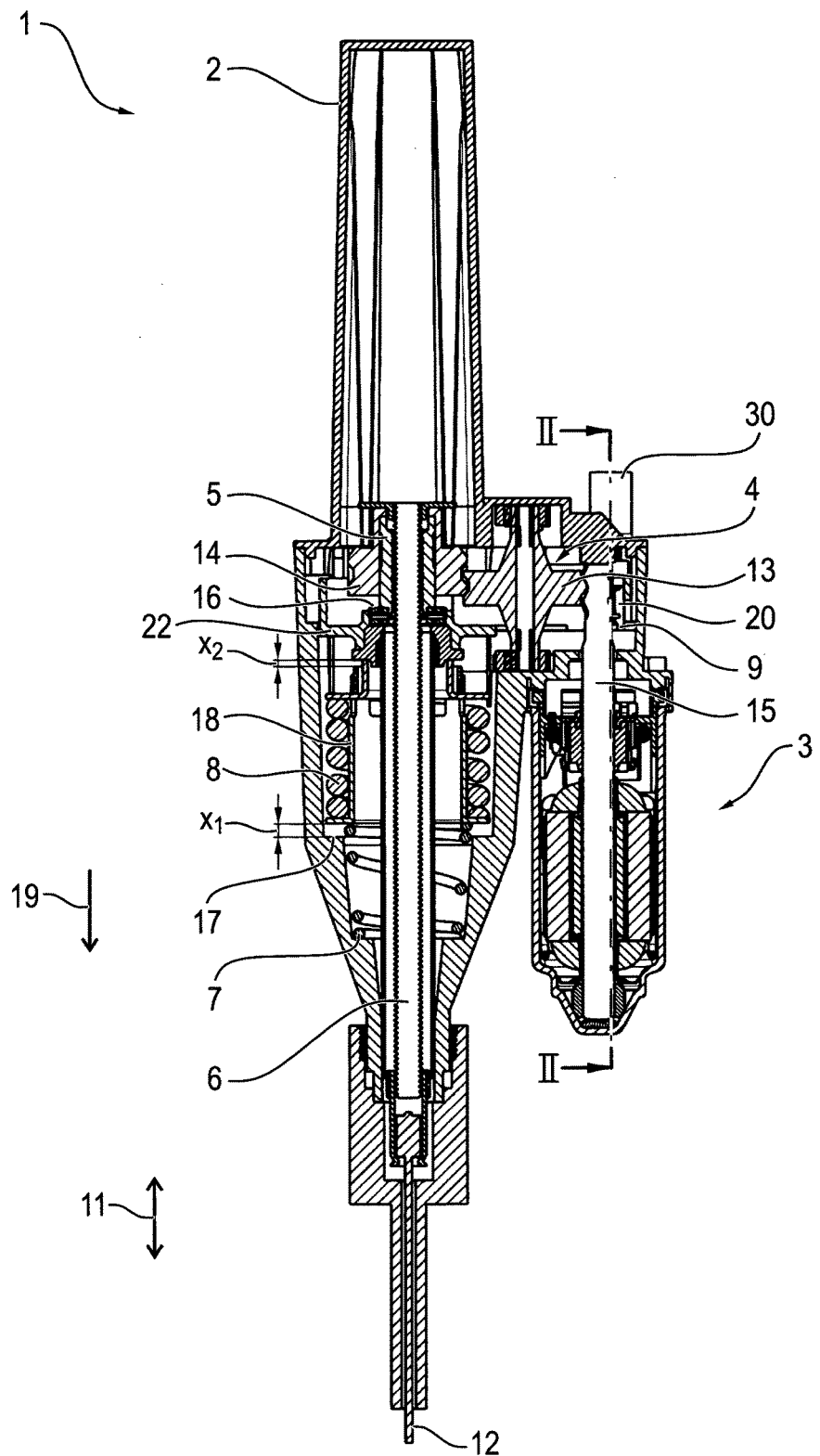
FIGS. 1 and 2 are different diagrammatic, longitudinal-sectional views of an actuator for a motor vehicle parking brake.
Figure 2:
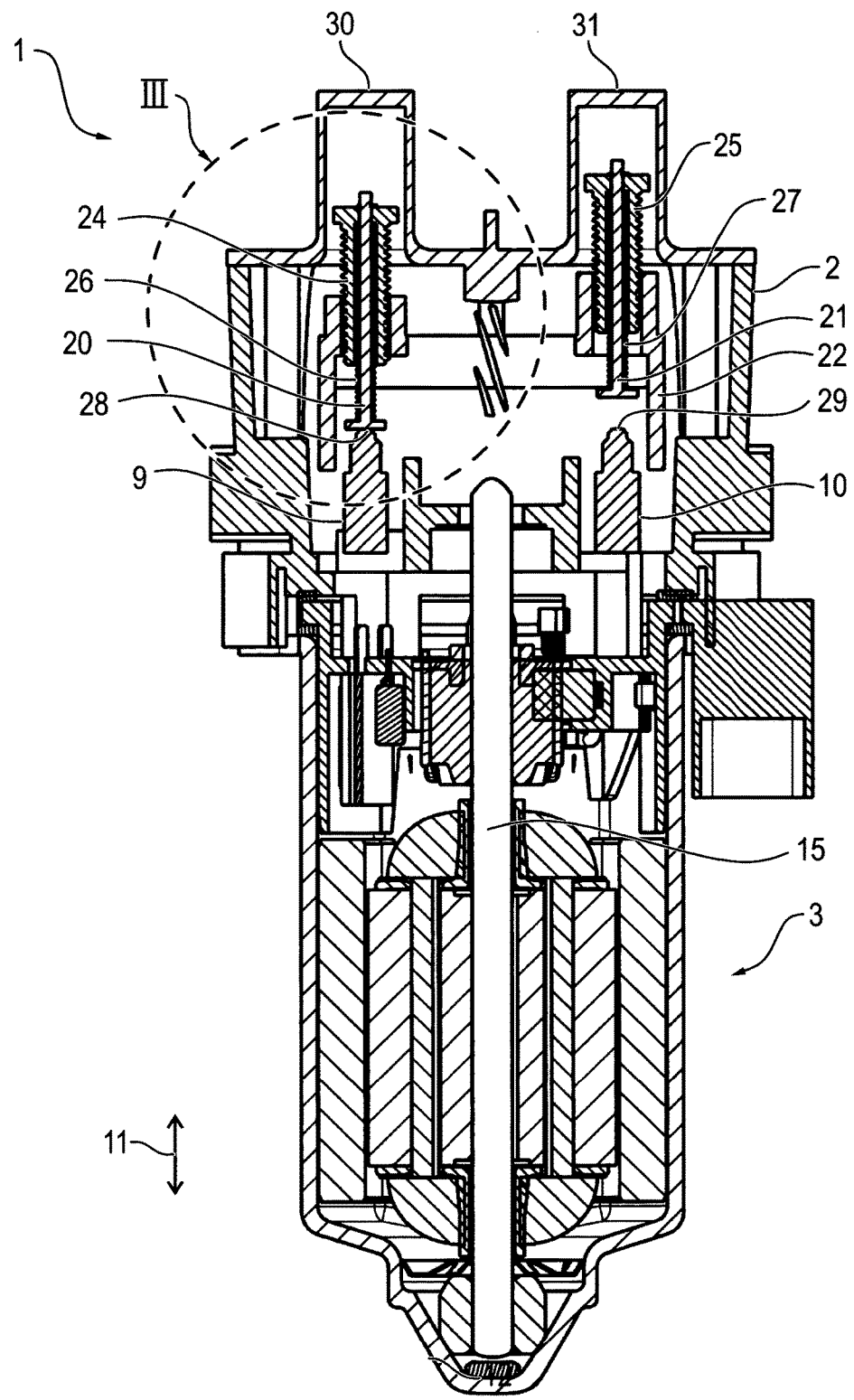
Figure 3:
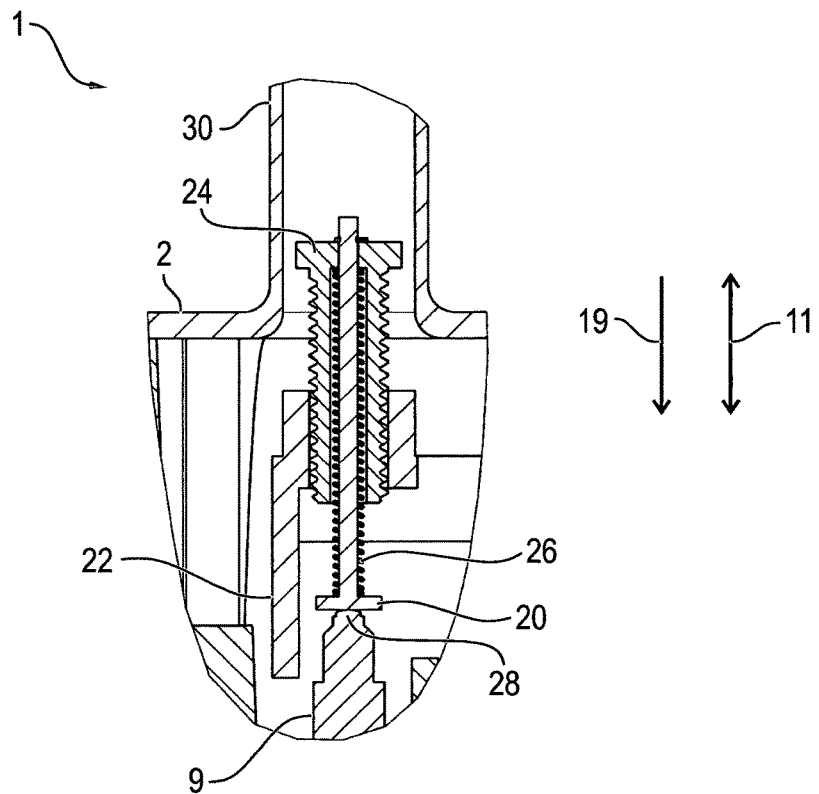
FIG. 3 is an enlarged, fragmentary, longitudinal-sectional view of a portion III of the actuator of FIG. 2.

Referring now in detail to the figures of the drawings, in which components that correspond to each other are always indicated with the same reference numerals, and first, particularly, to FIGS. 1-3 thereof, there is seen an actuator 1 for an electronic parking brake of a motor vehicle. The actuator 1 includes a housing 2 and, disposed therein, an electric motor 3, a gear mechanism 4, a spindle nut 5, a spindle 6 and first and second respective (helical) springs 7 and 8. The actuator further includes a force measurement device which is formed by the two springs 7 and 8 and respective first and second micro switches 9 and 10.

The electric motor 3 produces an actuating force which is necessary for operating the parking brake and transmits it through the gear mechanism 4 to the spindle nut 5. The spindle nut 5 acts as a force transmission unit and adjusts the spindle 6 which is in engagement with the spindle nut 5. The spindle 6 is axially displaced in a force transmission direction 11 during operation of the actuator 1. The spindle 6 acts as an actuating member on a brake cable 12 which is connected to the spindle 6 in technical terms so as to transmit force.

The gear mechanism 4 is formed by two toothed wheels 13 and 14 which are connected to a drive shaft 15 of the electric motor 3 at a drive side and to the spindle nut 5 at an output side.

The first and second springs 7 and 8 are disposed coaxially relative to the spindle 6 in series. Both springs 7 and 8 are in the form of compression springs. The spindle nut 5 is supported through an axial bearing 16 against the spring 8 (and, furthermore, against the spring 7). The spindle nut 5 is thereby mounted so as to be displaceable in the force transmission direction 11. The first spring 7 is limited by a stop 17 to a first resilient excursion $x_1$. The second spring 8 is mounted in a pretensioned state on a clamping sleeve 18. The clamping sleeve 18 is configured in such a manner that the second spring 8 is limited to a second resilient excursion $x_2$. The spindle nut 5 can thereby be displaced (in a pressure direction 19 toward both springs 7 and 8) by a measuring travel which corresponds to the sum of the first resilient excursion $x_1$ and the second resilient excursion $x_2$. The pressure direction 19 is, as is known, orientated parallel to the force transmission direction 11.

Under the action of the actuating force, the spindle 5 is displaced counter to the pressure direction 19 in order to activate the parking brake. As a result of the resultant tensioning of the brake cable 12, a counter-force which corresponds to the actuating force and which acts in the pressure direction 19 is produced. If the actuating force or the counter-force of the brake cable 12 exceeds the resilient force of the spring 7 or 8, they are compressed by the respective resilient excursion $x_1$ or resilient excursion $x_2$. The micro switches 9 and 10 are configured and provided to detect a displacement of the spindle nut 5 in the pressure direction 19 and consequently an actual value of the actuating force, which value is associated with the resilient excursion $x_1$ or resilient excursion $x_2$. In order to actuate the micro switches 9 and 10, a respective sensor pin 20 and 21 is fixed to a bridge 22 as a first or second stop element. The bridge 22 is connected to the spindle nut 5 through the axial bearing 16 so that the bridge 22 is displaced with the spindle nut 5.

FIG. 2 and FIG. 3 illustrate the configuration of the micro switches 9 and 10 and the sensor pins 20 and 21. The sensor pins 20 and 21 are supported in a resilient manner in a helical sleeve 24 and 25 through respective helical springs 26 and 27. The helical sleeves 24 and 25 are screwed into the bridge 22 with different spacing with respect to the respective micro switches 9 and 10. It is thereby possible for the micro switch 9 to already be actuated when the first spring 7 is compressed and for the micro switch 10 to be actuated by the sensor pin 21 only at the end of the measuring travel, that is to say, in the event of compression of both springs 7 and 8 by the actuating paths $x_1$ or $x_2$.

As a result of the resilient support, the sensor pin 20 can advantageously be compressed by the total measuring travel when the spindle nut 5 is displaced after the micro switch 9 is actuated. This is particularly advantageous since the switching travel, that is to say, the path which a push-button 28 or 29 of the respective micro switch 9 or 10 can travel is smaller than the entire measuring travel of the spindle nut 5. For example, the measuring travel may be approximately 7 mm and the switching travel of the micro switches 9 and 10 may be only approximately from 1 to 3 mm. The housing 2 has in the region of the two sensor pins 20 and 21 a dome-like formation 30 and 31, in which the respective helical sleeve 24 and 25 projects and in which the compressed sensor pins 20 and 21 can be introduced. The sensor pins 20 and 21 are mounted in such a manner that the pretensioning force of the helical springs 26 and 27 exceeds the switching force necessary for actuating the respective micro switches 9 and 10.

The spring 7 has a comparatively low resilient rigidity so that an actuating force of, for example, from 50 to 150 Newton—in accordance with the configuration of the parking brake and the motor vehicle—is sufficient for displacing the spindle nut 5. With preferred dimensions of the actuator 1, a value of approximately from 50 to 130 Newton is provided as the first actual value of the actuating force for displacing the spindle nut 5 counter to the first spring 7. In a simple construction of the spring 7, the spring is tensioned by the entire resilient excursion $x_1$.

The spring 8 has a resilient rigidity which is substantially higher than the spring 7. The spring 8 is pretensioned by the clamping sleeve 18 in such a manner that the spring 8 is compressed only in the case of a second actual value of the actuating force, for example, of approximately from 1300 to 1800 Newtons, wherein the second actual value is again dependent on the configuration of the parking brake and the motor vehicle. With preferred dimensions, the second actual value is approximately from 1400 Newtons to 1600 Newtons. The second spring 8 is tensioned by the entire resilient excursion $x_2$ in a simple configuration.

Figure 4:
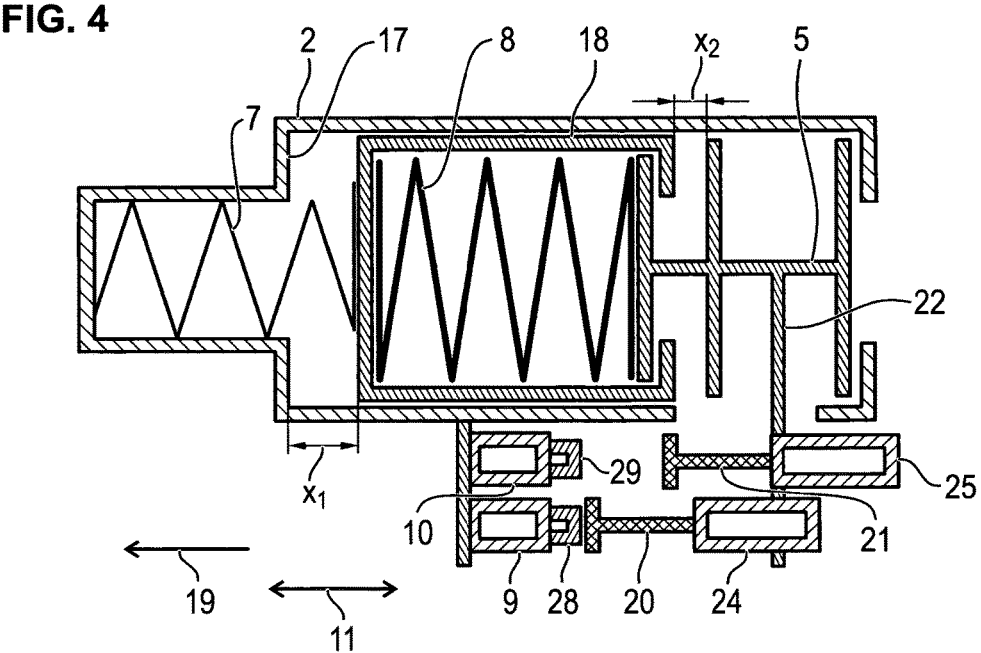
FIGS. 4 to 6 are simplified, sectional, diagrammatic illustrations of the actuator in an unloaded, partially loaded and completely loaded position.
Figure 5:
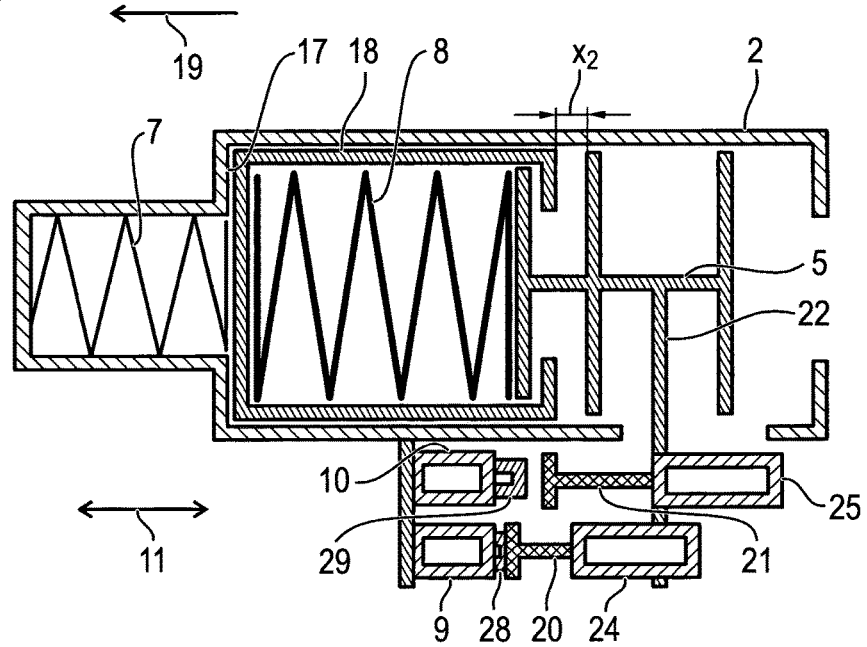
Figure 6:
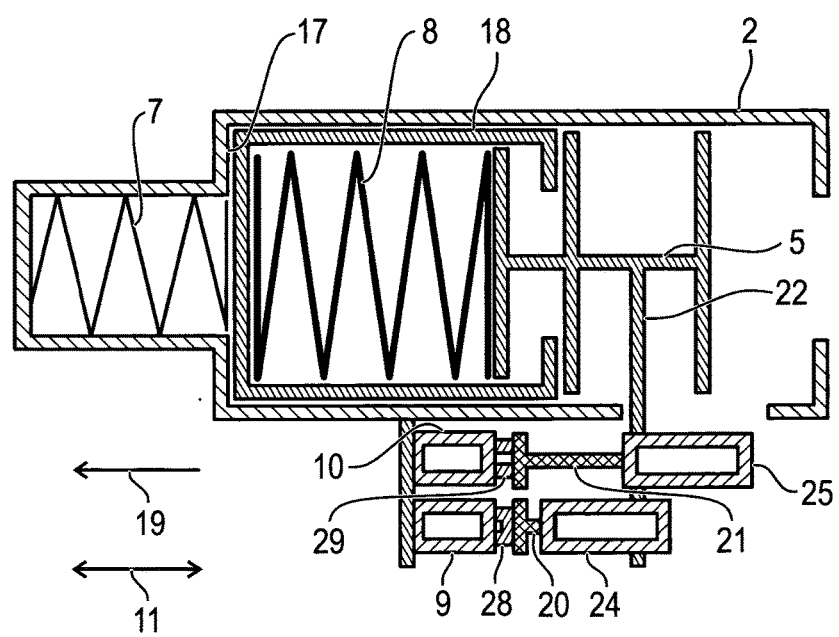

The functional principle of the force measurement device is diagrammatically illustrated in FIGS. 4 to 6. In FIG. 4, the actuator 1, in particular the spring 7, is completely relaxed and the spring 8 is pretensioned against the clamping sleeve 18, that is to say, no braking force or actuating force is applied to the brake cable 12. The push-buttons 28 and 29 of the two micro switches are not in contact with the respective sensor pins 20 and 21. If the electric motor 3 is now activated so that the brake cable 12 is tensioned, the actuating force increases until the first actual value is reached. The spring 7 is thereby compressed by the resilient excursion $x_1$ with the spindle nut 5 being displaced. As a result of the displacement of the spindle nut 5, the sensor pin 20 comes into contact with the push-button 28 of the micro switch 9 and actuates the micro switch 9 so as to move the switching travel (see FIG. 5). The sensor pin 20 is not in contact with the micro switch 10 or the push-button 29 thereof. With further rotation of the spindle nut 5, the spindle 6 is further displaced counter to the pressure direction 19 and the brake cable 12 is further tensioned, with the clamping sleeve 18 abutting the stop 17. If the actuating force reaches the second actual value, the spindle nut 5 is displaced counter to the spring 8 by the resilient excursion $x_2$. The sensor pin 20 is compressed into the helical sleeve 24 and the sensor pin 21 comes into contact with and actuates the push-button 29 of the micro switch 10.

The switching signal of the micro switch 10 consequently indicates that the second actual value of the actuating force has been reached. The switching signal is advantageously used to switch off the actuator 1, in particular the electric motor 3 thereof, in order to prevent an overload of the actuator 1 or the brake cable 12.

When the brake cable 12 is relaxed by rotation of the spindle nut 5 in the opposite direction, first the spring 8 is relaxed and subsequently, if the actuating force has decreased to the first actual value, the spring 7 is relaxed. When the spring 7 is relaxed and the spindle nut 5 is displaced counter to the pressure direction 19, the micro switch 9 is switched off so that, depending on the configuration of the micro switch 9, for example, a voltage change or voltage decrease of the switching signal can be used to switch off the actuator 1. Consequently, the actuator 1 is readily configured to detect two end positions (fixed by the first and second actual values) of the brake cable 12 or the spindle 6, whereby simple control of the actuator 1 is possible.

For assembly, the springs 7 and 8 are, for example, acted on through the spindle 6 with a defined force value (that is to say, the first and second actual values) and the respective sensor pin 20 and 21 is screwed into the bridge 22 through the helical sleeve 24 and 25 to such a depth that the micro switch 9 and 10 is actuated at the respective force value. Due to the helical sleeve 24, 25 being adjusted, the sensor pin 20 and 21 retained therein can be axially adjusted. The axial adjustability of the sensor pins 20 and 21 allows precise adjustment of the switching subassembly formed by the sensor pin 20, 21 and the associated micro switch 9 and 10 to the respective specified switching point (in this instance, the specified force value).

Figure 7:
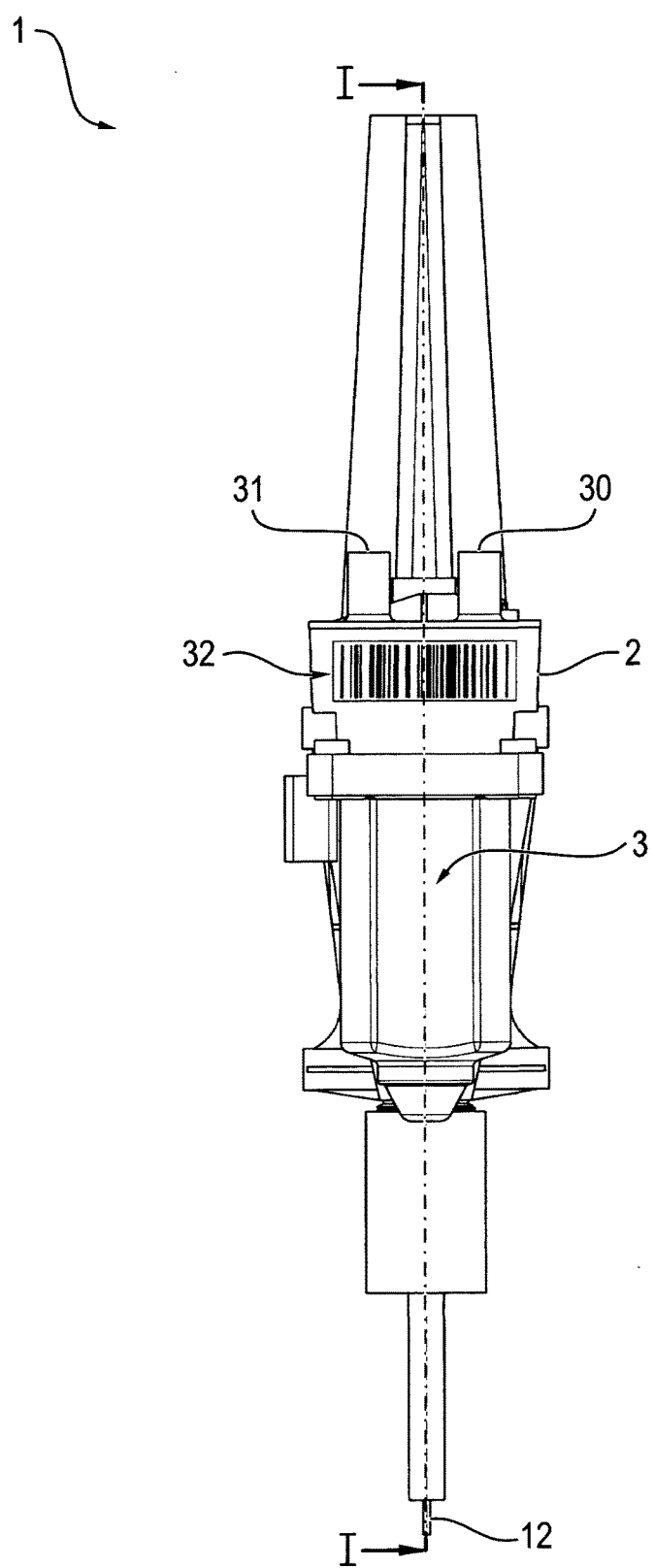
FIG. 7 is an elevational view of an alternative embodiment of the actuator.

In an advantageous embodiment which is an invention itself and which is illustrated in FIG. 7, the first actual value and the second actual value are fitted in an encrypted state to the housing 2 of the actuator 1 by using a (machine-readable) bar code 32. For example, the bar code 32 can be produced by laser in the housing 2 (in the form of a laser engraving or laser inscription) or can be fitted as an adhesive label. The actuator 1 does not include any individual, that is to say, integrated, control or evaluation unit. The first and the second actual values cannot thereby be stored in a storage module of such a control or evaluation unit and be transmitted to a superordinate control unit. As a result of the identification of both actual values on the housing, it is readily possible to transmit the actual values to the superordinate control unit, in particular in the case of externally structurally identical actuators 1 which are, however, provided with different respective springs 7 and 8. It is thereby also advantageously possible to store and transmit tolerances brought about by production and assembly with respect to the springs 7 and 8 and consequently with respect to the first and second actual values.

The subject matter of the invention is not limited to the above-described embodiments. Instead, other embodiments of the invention may be derived by the person skilled in the art from the above description. In particular, the individual features of the invention and the construction variants thereof, which features are described with reference to the different embodiments, may also be combined with each other in different manners.

The invention claimed is:

1. An actuator for a functional unit of a motor vehicle, the actuator comprising:
   a drive unit producing an actuating force;
   an actuating member;
   a force transmission unit configured to transmit said actuating force to said actuating member, said force transmission unit being supported so as to be displaceable by a measuring travel in a force transmission direction; and
   a force measurement device configured to detect a first actual value and a second actuating value of said actuating force, said force measurement device including:
      a first spring acting in said force transmission direction and having a resilient action counter to which said force transmission unit can be displaced, said first spring configured to be tensioned under action of said actuating force over a first resilient excursion;
      a first micro switch having a switching travel being smaller than said measuring travel of said force transmission unit and being actuated upon a displacement of said force transmission unit over said first resilient excursion if said actuating force reaches said first actual value to detect said first actual value;
      a first stop element configured to actuate said first micro switch;
      said first micro switch or said first stop element being coupled to said force transmission unit, said first stop element or said first micro switch being fixed in position relative to said force transmission unit, and at least one of said first micro switch or said first stop element being resiliently supported to compensate for a difference between said switching travel of said micro switch and said measuring travel of said force transmission unit;
      a second spring disposed in series with said first spring, said second spring being pretensioned by a pretensioning force exceeding said first actual value of said actuating force, said second spring being configured to be tensioned over a second resilient excursion by an action of said actuating force if said actuating force exceeds said pretensioning force;
      a second micro switch being actuated to detect said second actual value corresponding to a displacement of said force transmission unit over said second resilient excursion upon said force transmission unit being displaced over said second resilient excursion;
      said first micro switch providing a signal being used directly to switch off said drive unit upon said first actual value being reached; and
      said second micro switch providing a switching signal setting out a switch-off criterion for said drive unit upon said second actual value being reached to prevent an overload.

2. The actuator according to claim 1, wherein said first stop element is a first sensor pin being resiliently supported and pretensioned with a sensor pin pretensioning force being higher than said actuating force of said first micro switch.

3. The actuator according to claim 1, wherein said force measurement device has a second stop element to actuate said second micro switch, said second micro switch or said second stop element is coupled to said force transmission unit, and said second stop element or said second micro switch is fixed in position relative to said force transmission unit.

4. The actuator according to claim 3, wherein said second stop element is a second sensor pin being resiliently supported and pretensioned with a sensor pin pretensioning force being greater than an actuating force of said second micro switch to compensate for a difference between a switching travel of said second micro switch and said measuring travel of said force transmission unit.

5. The actuator according to claim 1, wherein said switching travel of said first micro switch and said second micro switch is orientated parallel to said force transmission direction, and at least one of said first micro switch and said second micro switch or said first stop element and said second stop element are disposed offset relative to each other along said force transmission direction.

6. The actuator according to claim 1, which further comprises a housing on which said actual value of said actuating force is indicated.

7. The actuator according to claim 6, wherein said actual value of said actuating force is marked on said housing in the form of a machine-readable encoding.

8. The actuator according to claim 7, wherein said machine-readable encoding is a bar code.

* * * * *